US007044847B2

(12) United States Patent
Ketels (10) Patent No.: US 7,044,847 B2
(45) Date of Patent: May 16, 2006

(54) APPARATUS AND METHOD FOR RECOVERING NECK MEAT FROM A FISH

(76) Inventor: Dieter Ketels, Fliederhof 11, 23775, Grossenbrode (DE)

( * ) Notice: Subject to any disclaimer, the term of this patent is extended or adjusted under 35 U.S.C. 154(b) by 0 days.

(21) Appl. No.: 10/864,033

(22) Filed: Jun. 9, 2004

(65) Prior Publication Data

US 2005/0153645 A1    Jul. 14, 2005

(30) Foreign Application Priority Data

Jan. 9, 2004    (DE) ............... 10 2004 001 598

(51) Int. Cl.
*A22C 25/16* (2006.01)
(52) U.S. Cl. .................................... 452/162
(58) Field of Classification Search ........... 452/52, 452/63, 64, 108, 107, 149, 150, 151, 153, 452/154, 163
See application file for complete search history.

(56) References Cited

U.S. PATENT DOCUMENTS

| 2,961,697 | A | * | 11/1960 | Schlichting et al. | ........ 452/170 |
| 3,364,517 | A | * | 1/1968 | Bartels | ........ 452/63 |
| 3,525,121 | A | | 8/1970 | Elich | |
| 3,680,174 | A | * | 8/1972 | Dohrendorf | ........ 452/187 |
| 3,838,478 | A | * | 10/1974 | Wulff | ........ 452/119 |
| 3,972,091 | A | * | 8/1976 | Dohrendorf | ........ 452/170 |
| 4,151,629 | A | | 5/1979 | Braeger | |
| 4,599,765 | A | * | 7/1986 | Kristinsson | ........ 452/170 |
| 4,630,335 | A | * | 12/1986 | Claudon | ........ 452/121 |
| 5,466,186 | A | | 11/1995 | Hjorth | |
| 5,482,502 | A | | 1/1996 | Hjorth | |
| 5,492,502 | A | | 2/1996 | Hjorth | |
| 5,536,205 | A | | 7/1996 | Braeger et al. | |
| 5,735,735 | A | * | 4/1998 | Hahn et al. | ........ 452/119 |
| 6,200,211 | B1 | | 3/2001 | Braeger et al. | |
| 6,361,426 | B1 | | 3/2002 | Kragh | |

FOREIGN PATENT DOCUMENTS

| GB | 1 372 060 | 10/1974 |
| WO | WO 2004/066740 A1 | 8/2004 |

OTHER PUBLICATIONS de Silva, C.W., and N. Wickramarachchi, "An Innovative Machine for Automated Cutting of Fish,"., *Proceedings of IEEE/ASME Transactions on Mechatronics* 2(2): 86-98, Jun. 1997.

* cited by examiner

*Primary Examiner*—Thomas Price
(74) *Attorney, Agent, or Firm*—Christensen O'Connor Johnson Kindness PLLC (57) ABSTRACT

A method and apparatus for recovering neck meat from a fish head that has been separated from the trunk of a fish comprises a pivoting device that receives and pivots the fish head into a chin-up position, followed by a synclinal chamber that holds the fish head, and a cutting blade operating near the bottom of the fish head for separating the neck meat from the fish head. The synclinal chamber holds the fish head in a chin-up position so that the neck meat protrudes downwardly in the direction of the cutting blade. The pivoting device may be a rotating drum having one or more chambers. The synclinal chamber includes an underside and a synclinal catch between which is a passage through which the neck meat protrudes and is cut off. The amount of protruding neck meat is adjustable by adjusting the width of the passage.

28 Claims, 8 Drawing Sheets

APPARATUS AND METHOD FOR RECOVERING NECK MEAT FROM A FISH

FIELD OF THE INVENTION

The invention concerns a method and apparatus for recovering neck meat from a fish whose head has been separated from its trunk.

BACKGROUND OF THE INVENTION

With an ongoing increase of fishing in fishing grounds, the question of efficient utilization of fish meat has acquired pressing urgency. In particular, the acquisition of good-tasting fish meat plays a large role in this question. Included in this category is the muscular neck meat of the fish. Up to now, conventional methods largely dictate that this section of meat be separated from the trunk of the fish collectively with the head and channeled for non-human consumption. For this reason, ways of extracting the neck meat from the neck region of severed fish heads have already been sought. In conventional processing methods, the neck meat remains on the fish head. To economically recover such neck meat, the neck meat must be separated from the head by machine, without adding expensive supplementary devices to the conventional machines that are used to separate the fish head from the trunk of the fish.

One prior known method of separating the neck meat from a severed fish head requires complicated mechanical features to properly orient the fish head relative to adjustable blades that cut off the neck meat. Relatively complicated controlled guiding processes are required to direct the fish head and blades into a proper position for separating the neck meat.

Specifically, a suitable separating machine is used for the purpose of cutting off the fish head. This machine separates the fish head from the trunk and guides the fish head to a special machine for separating the neck meat. This machine links up downstream with the separating machine and uses electronic guidance processes to direct the cutting tools into a properly suited cutting position for cutting off the neck meat. Such complementary pieces of equipment are expensive due to the guidance processes used and beyond that, they have the distinct disadvantage of obstructing the movement of the person operating the separating machine. The operator is restricted in his actions due to limitations on his access to the machine for which he must, by trade, normally assume monitoring responsibility. The effectiveness of the work force deployed using this prior art system is considerably reduced.

The task of the present invention is, therefore, to improve upon the process and on the device initially described such that the operator of the separating machine is not restricted in the degree of his activities.

SUMMARY OF PREFERRED EMBODIMENTS OF THE INVENTION

The present invention provides a novel method and apparatus for cutting neck meat from a fish head that has been separated from the trunk of the fish and guided into a separating position. With this method, the fish head is guided in the direction of a blade that separates the neck meat from the rest of the head. The method can be implemented at a considerably lower cost than with extensive electronic guidance controls as provided in the prior art. Electronic scanning of the respective position of the head is not required. Instead, simple mechanical guidance elements bring the head into a chin-up position in which a blade disposed near the bottom of the head separates the neck meat from the fish head. The separated neck meat subsequently slides into a collector from which it can be removed in a simple manner for further processing.

Apparatus constructed according to one preferred embodiment of the invention includes a device that pivots the severed fish head into a separating position, followed by a separating device comprised of a chamber that holds the head in a cutting position, from which chamber the head, together with its neck meat to be separated, protrudes in the direction of the blade that cuts off the neck meat. The pivoting device ensures that the head, after having been separated from the trunk of the fish, will fall into the chamber in the proper cutting position for cutting off the neck meat, in which position the task of cutting off the neck meat is undertaken by an appropriately arranged blade. The following aspects of the present invention are best understood when read in connection with the detailed description provided below after the description of the drawings.

According to one aspect of a preferred embodiment of the invention, a fish's head is separated from its trunk by a cut running on a vertical plane, said cut being positioned at a right angle to a longitudinal axis extending through the fish and, by said cut, a surface is created for which the fish head is aligned for separation of the neck meat. In this manner, each head is provided with a cut surface against on its neck. The cut surface of the head is generally large, thus diminishing slippage of the head when the head is aligned for separation of the neck meat. The large cut surface helps guide the head during the pivoting process.

According to another aspect, the head is oriented such that the cut surface sits against a synclinal catch, which may be formed at about a 45° angle to a horizontal cutting plane, through which cutting plane the neck meat protrudes. The neck meat to be cut is delimited by sections of the forehead surface and the cut surface of the fish head. In this manner, the neck meat is seized by the cutting blade largely at the same position, from one fish head to the next, and the neck meat is separated from the rest of the head.

According to yet another aspect, the head is separated from a fish lying on one of its sides and is pivoted in an upright position for the separation of the neck meat where the cut surface of the neck is positioned against a synclinal catch. The design of this particular embodiment is desirable in that it allows an operator to use conventional fish processing methods in which the head is separated from the trunk while the fish lies on its side. In this position, the trunk is also transported further downstream as has been standard in previous practice. Only the head is pivoted in an upright position and is positioned against the synclinal catch for the purpose of separating the neck meat.

According to still another aspect, a pivoting device is provided to orient the fish head for recovery of the neck meat from a fish. The pivoting device is comprised of a drum rotating around a horizontally-arranged rotational axis. The drum is provided with chambers accessible from the drum's perimeter. Each chamber is configured to receive a fish head separated from the trunk of a fish. The drum rotates in a direction coinciding with the longitudinal direction of the head lying in the chamber. For separation of the neck meat from the head, the head is positioned in a chin-up position in which the neck meat can best be reached by a rotating circular blade operating near the bottom of the head.

According to another aspect, each of the chambers in the drum is defined by a support surface extending between lateral discs in proximity to the axis of rotation. The chambers are configured in a manner suited for receiving fish heads having a more or less basic triangular geometry. The lateral discs that define the drum provide a chamber in which the head is advanced in an upright position to an orientation in which the chin face surface and the forehead face surface of the head run in a generally upward direction. In this manner, a distinct positioning of the head is created in which the neck meat can be separated from the rest of the head with a cut from a rotating blade near the bottom of the head.

According to another aspect, each chamber in the drum includes a bracing surface that separates it from the neighboring chamber. The bracing surface extends from the support surface in the direction of the perimeter of the drum and is provided for bracing one of the heads, lying in the chamber, along its cut surface. In this manner, a simple design is created for the drum, which makes the drum less expensive on the one hand, and enables a very effective orientation of the head on the other hand.

According to another aspect, the drum rotates in a direction in which the head is conveyed with the cut surface of its neck up front, in the direction of the rotation. This rotational direction of the drum allows the fish head to be securely guided toward its cut surface on the one hand, and on the other hand, the fish head is oriented in the desired chin-up position after just a relatively short drum rotation, e.g., 130°.

According to another aspect, a fish head in a chamber of the drum is securely held in the drum in at least one rotational area of the drum. In that rotational area, the drum is surrounded by a stationary catch whose distance from the perimeter of the drum is dimensioned such that, upon rotation of the drum, the fish head does not jam between the catch and the perimeter of the drum. With the aid of this stationary catch, the fish head is most favorably guided in the chamber. After the drum has rotated and the stationary catch has completed its action, the fish head slides out of the chamber due to its own weight.

According to another aspect, the stationary catch begins near an upper section of the drum behind a loading station where the fish head is received in the chamber and begins to rotate with the drum. The stationary catch extends toward an outlet provided near a lower section of the drum, where the catch then runs tangential to the rotational direction of the drum. Near the lower section of the drum, the stationary catch is oriented toward a synclinal chamber into which the head slides lying primarily on its forehead face surface. The design of the stationary catch effectively guides the fish head for a smooth entry of the fish head into the synclinal chamber as well as for the release of the fish head out of the rotating drum. The fish head is introduced into the synclinal chamber without needing to scan its physical dimensions and there lies in a position favorable for cutting off the neck meat.

According to another aspect, the lateral discs of the drum may include bevels in the area of the bracing surface of each drum at the outer periphery of the bracing surface. The bevels enlarge the outlet profile section guiding the head in the direction of the synclinal chamber. These bevels improve the transfer of the head from the drum into the synclinal chamber to a considerable extent without compromising the secure guidance of the head inside of the drum.

According to another aspect, the stationary catch begins near an upper section of the drum, at a rotational angle of the drum of about 10° to 20° as calculated from a zero degree (vertical) point, and changes over into a tangential trajectory transiting into the synclinal chamber at a rotational angle of the drum of 120° to 140°. This construction of the stationary catch is advantageous in that the head can be received by the synclinal chamber in a secure manner, regardless of the head's weight.

According to another aspect, the synclinal chamber is constructed with an underside extending between two delimiting plates, and is shaped in a manner imitating the basic triangular geometry of a fish head. With this design of the chamber, the fish head lies inside the synclinal chamber such that it does not easily back away from the separating blade when the neck meat is being cut from the head.

According to another aspect, the underside of the synclinal chamber is formed to extend from the tangential trajectory of the stationary catch and support the forehead face surface of the fish head. This configuration ensures that the head will slide with secure guidance and without disturbing its reception into the synclinal chamber.

According to another aspect, the delimiting surfaces of the synclinal chamber possess a mutual spacing in which the head is guided in an upright position with its chin face surface oriented upwards. Furthermore, the head lies with its cut surface against a synclinal catch delimiting the synclinal chamber in the direction of the head sliding in. To this end, the synclinal catch advantageously runs at an angle of about 90° relative to the direction of the underside of the synclinal chamber. The head is thus securely guided from the time it is transferred from the drum to the time it assumes its final position in the synclinal chamber, and that once in the synclinal chamber, it does not back out when the neck meat is being cut from the head.

According to another aspect, the synclinal catch on the one side and the underside of the synclinal chamber on the other side create a passage through which the neck meat of a fish head lying in the synclinal chamber protrudes. The neck meat protrudes in the direction of a blade that separates the neck meat from the remainder of the head. In terms of the geometric configuration of the synclinal chamber, this passage is laid out such that the neck meat can be seized by the blade at a desired thickness and width, thus ensuring optimal separation of the neck meat from the remainder of the head.

According to another aspect, the synclinal chamber may be comprised of a plastic body. The plastic body can conform to each head sliding in and holds the head securely in the desired cutting position. Furthermore, the plastic body is comparatively lightweight in contrast to a similarly designed sheet metal body and thereby facilitates a desirable lightweight construction for the entire setup of the device.

According to another aspect, the synclinal catch is arranged for adjustment in the direction of the passage so that the size of the passage can be altered by sliding the synclinal catch. This design renders the passage adaptable to a specific profile determined by the fish heads being processed in a manner that is optimal, very favorable and quite simple.

According to another aspect, the synclinal chambers are securely connected to a conveyor belt extending beneath the drum. Owing to this conveyor belt, the synclinal chambers can be optimally guided in terms of a smooth transfer of the heads out of the drum. To this end, the synchronized control of the conveyor belt can be advantageously implemented in terms of a specified rotational speed of the drum.

According to another aspect, the blade that separates the neck meat operates on an approximately horizontal plane provided below the passage and the underside of the synclinal chamber at a narrow distance from the synclinal catch. A blade arranged in such a manner not only leads to an optimal recovery of the neck meat, but also to a secure synclinal catch, against which the head lies upon complete separation of the neck meat.

According to another aspect, the blade that separates the neck meat from the head is a rotating circular blade. Such a blade executes a smooth cut between the neck meat and the rest of the head without the need to apply considerable pressure on the head.

According to another aspect, the blade is arranged above a device that collects the neck meat and transports it away. The cut off neck meat can be collected without any additional control devices and can be directed downstream for further processing.

According to another aspect, the blade is arranged above a chute that transports the neck meat away. Furthermore, the remains of the head separated from the neck meat are discarded at the point of a guide wheel of the conveyor belt carrying the synclinal chambers. In this manner, the apparatus of the present invention achieves its intended function without the need for installing expensive additional equipment for further transportation of the neck meat or the head remains.

BRIEF DESCRIPTION OF THE DRAWINGS

The foregoing aspects and additional details of the invention become evident from the following detailed description and from the appended drawings in which a preferred embodiment of the invention has been visualized for the sake of providing an example. In the appended drawings.

DETAILED DESCRIPTION OF A PREFERRED EMBODIMENT

Figure 1:
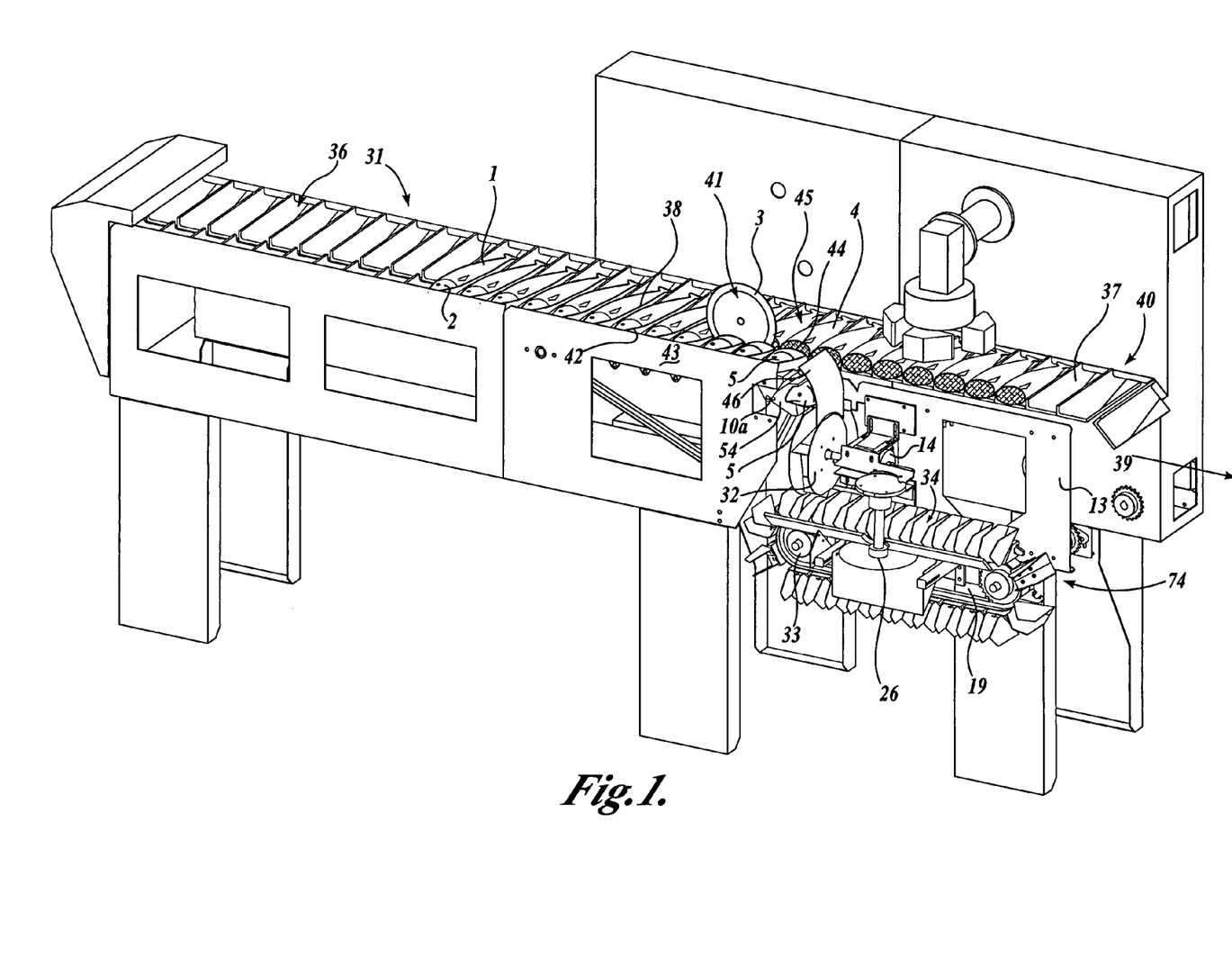
FIG. 1 shows a pictorial representation of a neck meat recovery apparatus according to an embodiment of the invention connected to a fish beheading machine.

An apparatus constructed according to one preferred embodiment of the invention is built onto a fish beheading machine (31) and includes a drum (32), a conveyor belt (33) with synclinal chambers (34) secured thereupon, and a neck meat cutting blade (26). As shown in FIG. 1, the beheading machine (31) is conventionally comprised of a circular endless chain system (36) with attached fish troughs (37) for receiving fish bodies (1) with fish heads (2). An operator, not represented here, places the fish bodies (1) oriented belly-to-back into the fish troughs (37) so that the fish are conveyed belly side (38) toward a beheading station (41) in the conveying direction (39) of the fish conveyor (40). The fish bodies (1) are generally abutted with their mouths (42) resting against a stationary mouth catch (43). In this manner, the fish bodies (1) are automatically positioned for a beheading cut (44) executed by a beheading blade (3). After the beheading cut (44), each fish body (1) consists of a trunk section (4) and a separated head (5). In this embodiment, both the head (5) and the trunk section (4) initially maintain their side position (45).

Figure 8:
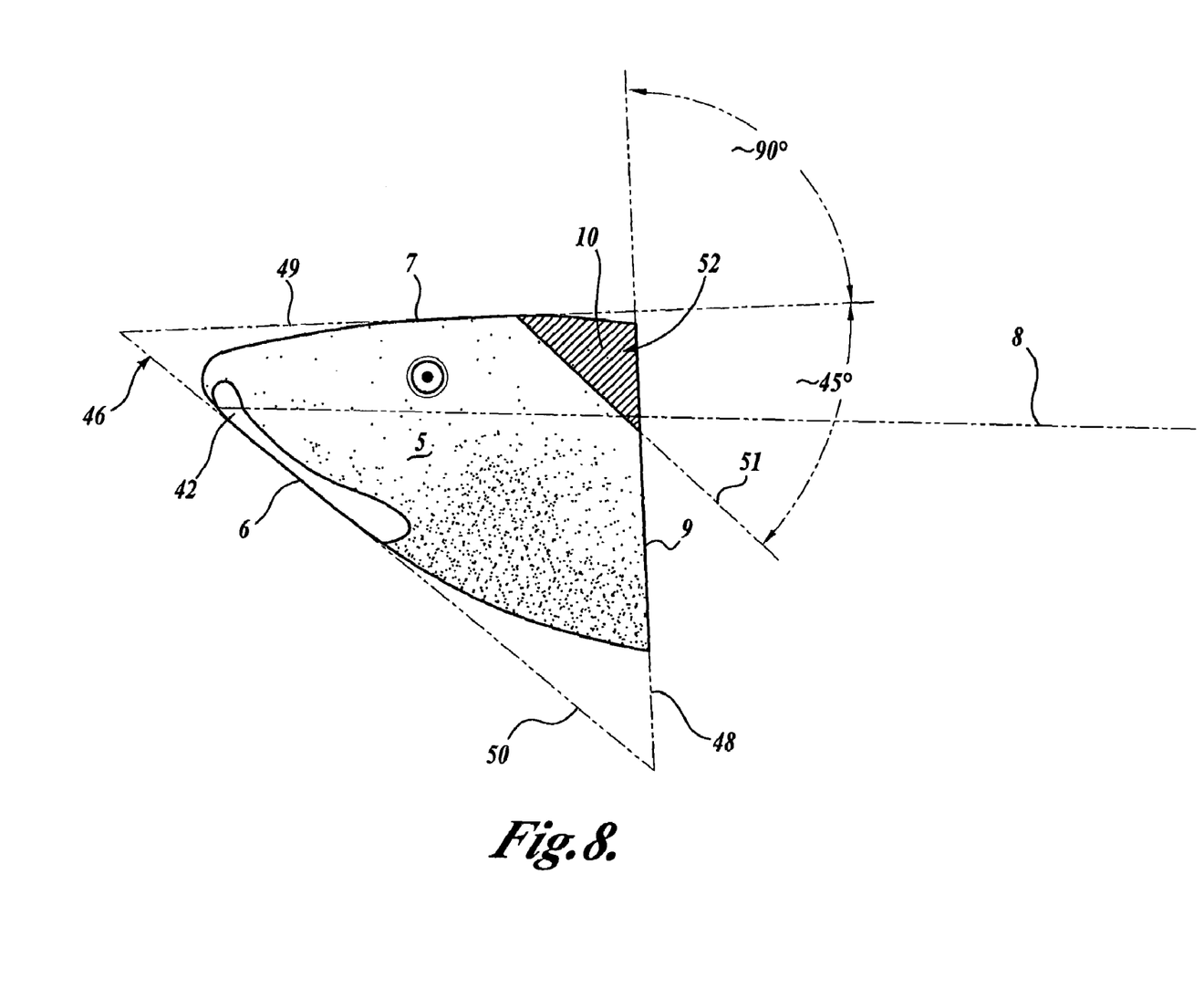
FIG. 8 shows a side view of a fish head with an indication of the neck meat and exemplary indications of the geometry of the fish head.

With this type of beheading machine (31), it is standard that the beheading cut (44) runs at about a right angle to the longitudinal axis (8) of the fish body (1), as further illustrated in FIG. 8. In this way, there remains on the separated head (5) a neck section (10) that contains a considerable amount of recoverable fish meat. The separated fish head (5) possesses the basic geometry of a right angle triangle (46), schematically represented in FIG. 8 in which the right angle lies in the neck section (10) and is comprised of, as the short sides (48, 49) of the right angle triangle (46), a cut surface (9) which is created upon separation of the head (5) from the trunk section (4), and a forehead face surface (7) which runs along a surface of the head (5) away from the mouth (42). The hypotenuse (50) runs along a chin side surface (6) of the fish head (5). In the context of this basic triangular geometry of the fish head (5), the neck meat (10) is defined on the one side by a section of the cut surface (9), by a section of the forehead face surface (7) and by a cutting line (51) running at about 45°, which cutting line cuts off sections from the short sides (48, 49) of the triangle that are more or less large depending on the size of the fish head (5). In this manner, the neck meat (10) forms a triangular section (52) in a cross profile, and the object of the device is to recover this triangular section of meat.

Figure 2:
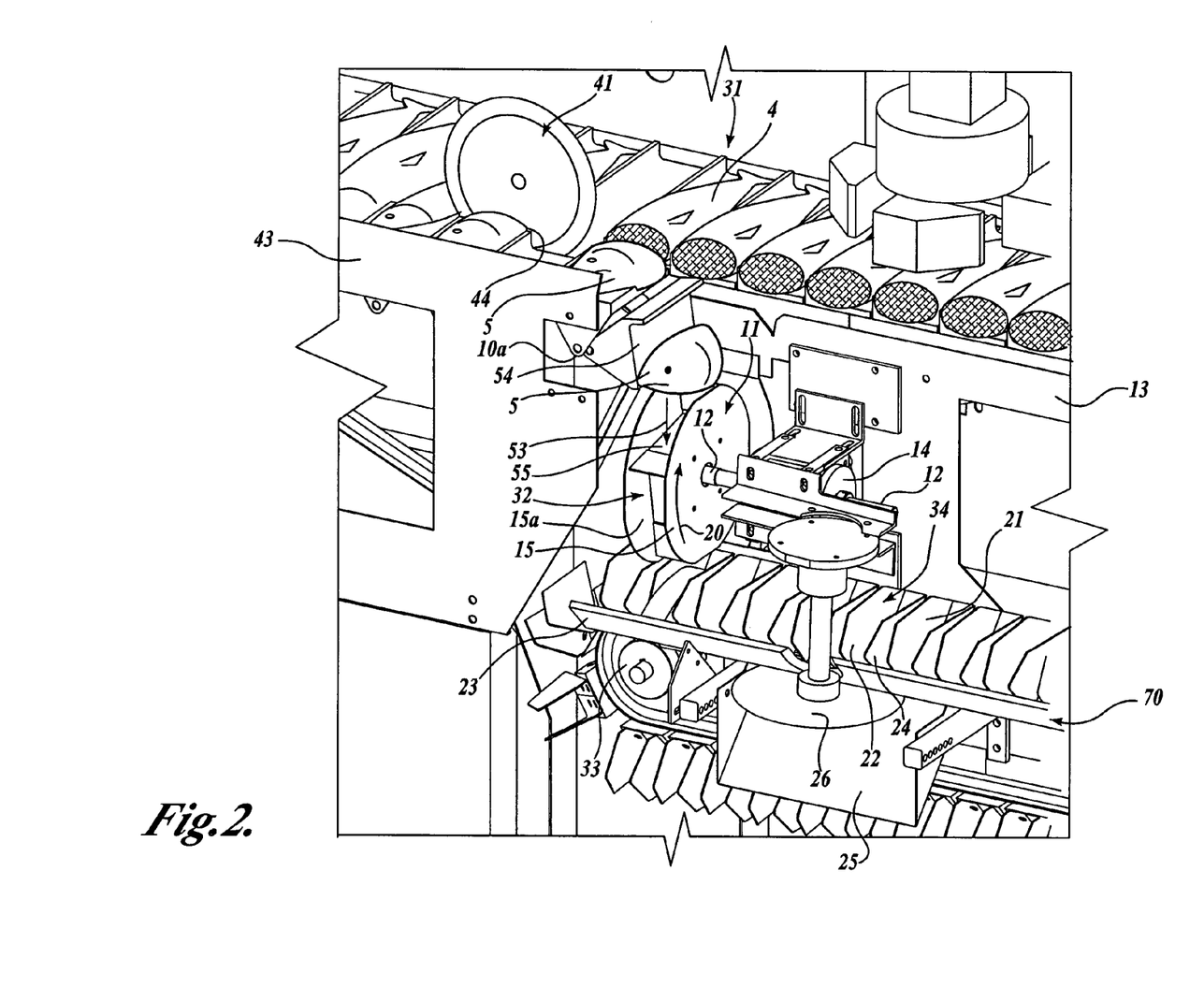
FIG. 2 shows an enlarged representation of the connection between the fish beheading machine and the apparatus in the area of a fish head transfer station.

On the end of the sectional conveyor conveying the fish heads (5) before and after their separation from the trunk section (4), a chain wheel (10a) is provided by which the cut off head (5) is steered away from the direction (39) of the chain system (36), so that the cut off fish head (5) falls downward, out of a head trough (54) in a vertical direction (53) guided by a guide surface 46 (shown in FIG. 1 and removed in FIG. 2). The empty head trough (54) is then led back by the belt of the sectional conveyor. The cut off head (5) falls out of the head trough (54) into a pivoting device (11), which in this embodiment is comprised of a drum (32) located beneath the rerouting station of the sectional conveyor of the beheading machine (31), at the chain wheel (10a). The drum (32) possesses a rotational axis (12) running in a generally horizontal direction, which extends in the conveying direction (39) of the fish conveyor (40). The fish conveyor (40) possesses a machine frame (13) that runs approximately parallel to the direction of the rotational axis (12). The rotational axis (12) is driven in synchrony with the speed of the beheading machine (31) by means of a miter wheel gear (14).

The drum (32) includes two lateral discs (15, 15a) arranged in mutually parallel planes between which four identical chambers (55, 56, 57, 58) are configured. Depending on the rotational speed of the rotational axis (12) and the size of the drum (32), a greater or smaller number of chambers (55, 56, 57, 58) can be provided. In their cross profile as shown in FIGS. 3–7, the chambers are dimensioned such that they can accommodate the basic triangular geometry of the heads (5) in an upright position. For this, the width of the chambers (55, 56, 57, 58) is preferably slightly larger than the width of a head (5) as calculated from one lateral side to the one opposite it.

Figure 3:
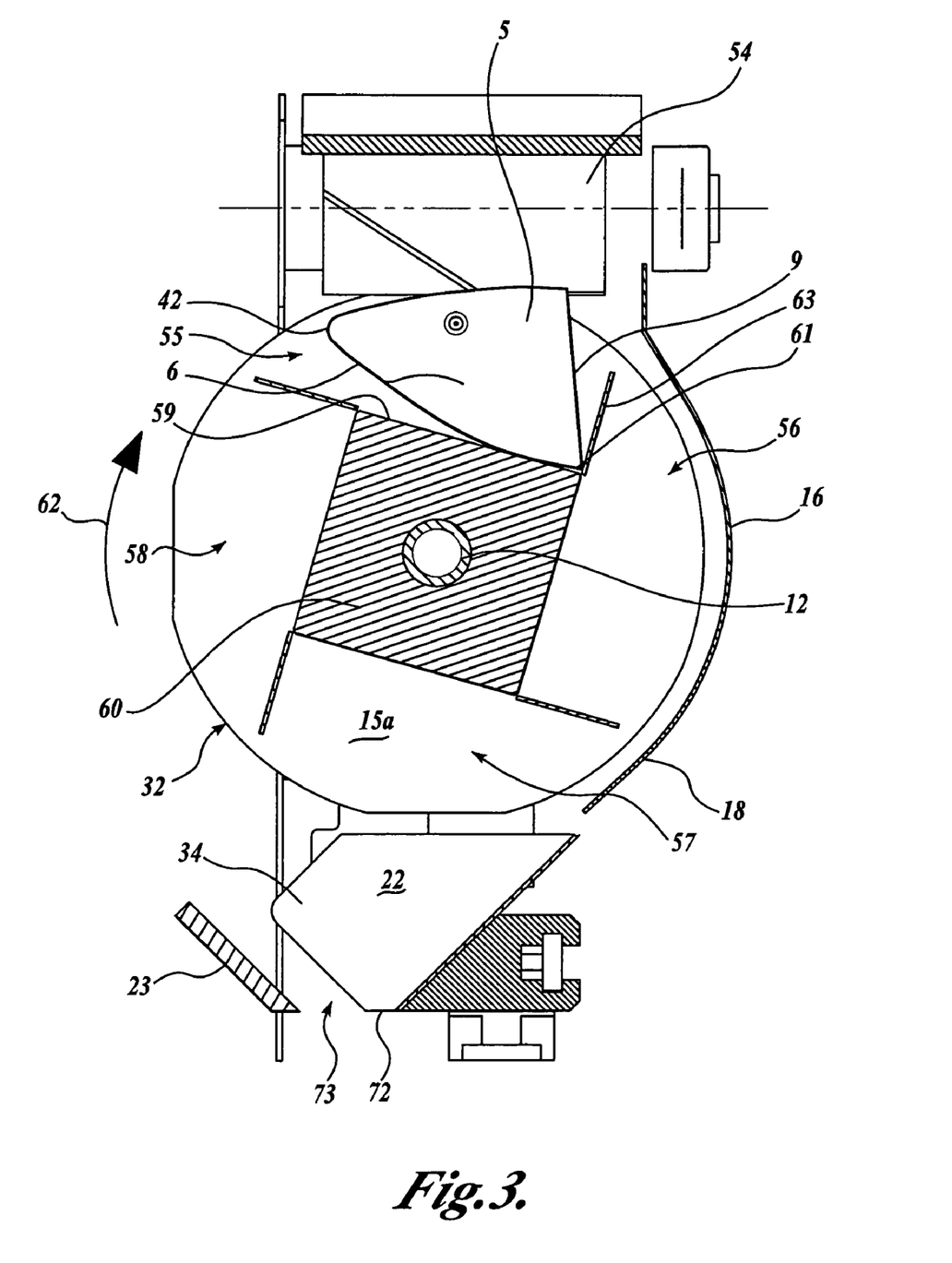
FIG. 3 shows a cross sectional view of a drum with a stationary catch as depicted in FIG. 2.

The synchronization of the drum (32) is calculated in such a manner that, at the point in time when the head (5) falls out of the head trough (54), a chamber (55) of the drum (32) will be positioned beneath the head (5). As shown in FIG. 3, the head (5) falls into the chamber (55) and initially lands with its chin face surface (6) on an underside (59) in the chamber (55), said underside (59) defining the chamber from a midsection (60) of the drum (32). When the head (5) lands on its chin face surface (6), the underside (59) is preferably positioned to run at an incline to a horizontal running plane. This makes the head (5) slide with the cut surface (9) toward a section (61) of the chamber (55) lying deeper than the mouth (42) which lies in a more elevated section of the underside (59). In this manner, the chamber (55) possesses a profile imitating a right angle triangle, which provides a large supporting surface for the head (5) in the chamber (55). The chambers (55, 56, 57, 58) are each respectively defined by the underside (59) and the two lateral discs (15, 15*a*). The midsection (60) provides a distance between the two discs (15, 15*a*) so that the heads (5) cannot fall over inside of the chambers (55, 56, 57, 58), even when the drum (32) is being rotated around its rotational axis (12). In the position of the drum (32) shown in FIG. 3, the head (5) is propped upright in the chamber (55). The drum (32) is situated in a 15° position as compared to an initial position in which the boundaries of the chambers (55, 56, 57, 58) run parallel to the vertical or the horizontal diametrical lines of the drum (32).

Figure 4:
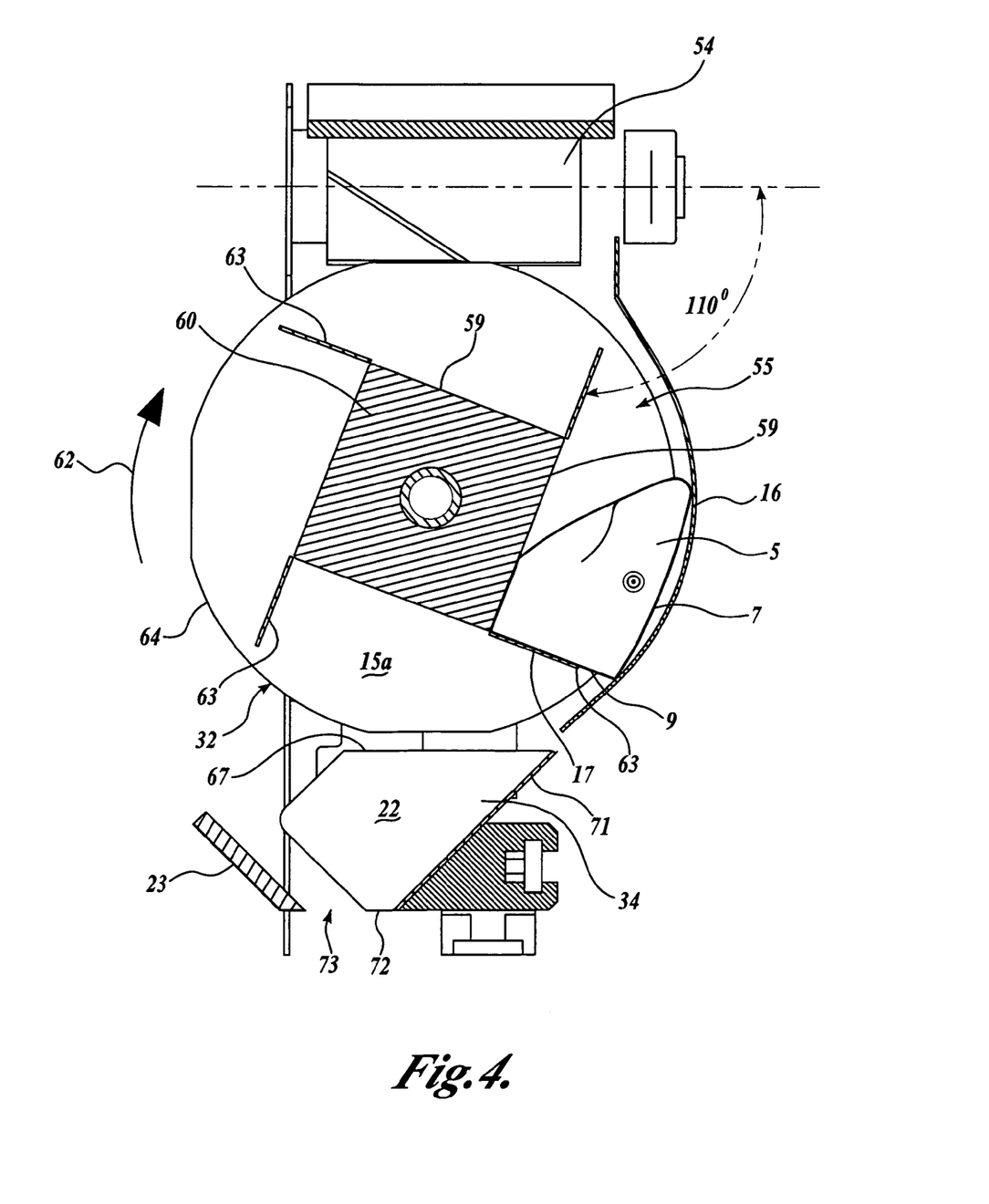
FIG. 4 shows a cross sectional view of the drum shown in FIG. 3 after rotation of the drum of about 90° in contrast to the representation in FIG. 3.

As shown in FIG. 4, upon further turning of the drum (32) in the rotational direction (63), the head (5) changes its position in the chamber (55) and leans with its cut surface (9) against a bracing surface (63) that extends perpendicular to the underside (59) of the chamber (55). Due to the forces of gravity, the head (5) would then tend to fall out of the chamber (55). However, it may lean with its forehead face surface (7) against a stationary catch (16) running approximately concentric to the rotational axis (12). The stationary catch (16) runs at a slight distance from the perimeter (64) of the discs (15, 15*a*) in such a manner that the head does not jam between the fixed stationary catch (16) and the perimeter (64) while the drum (32) is rotating. The leaning of the forehead face surface (7) of the head (5) on the stationary catch (16) generally occurs in the range of an angle of rotation between about 100° to 110° as illustrated in FIG. 4. The head (5) rests with its cut surface (9) against a wall (17) formed by the bracing surface (63).

Figure 5:
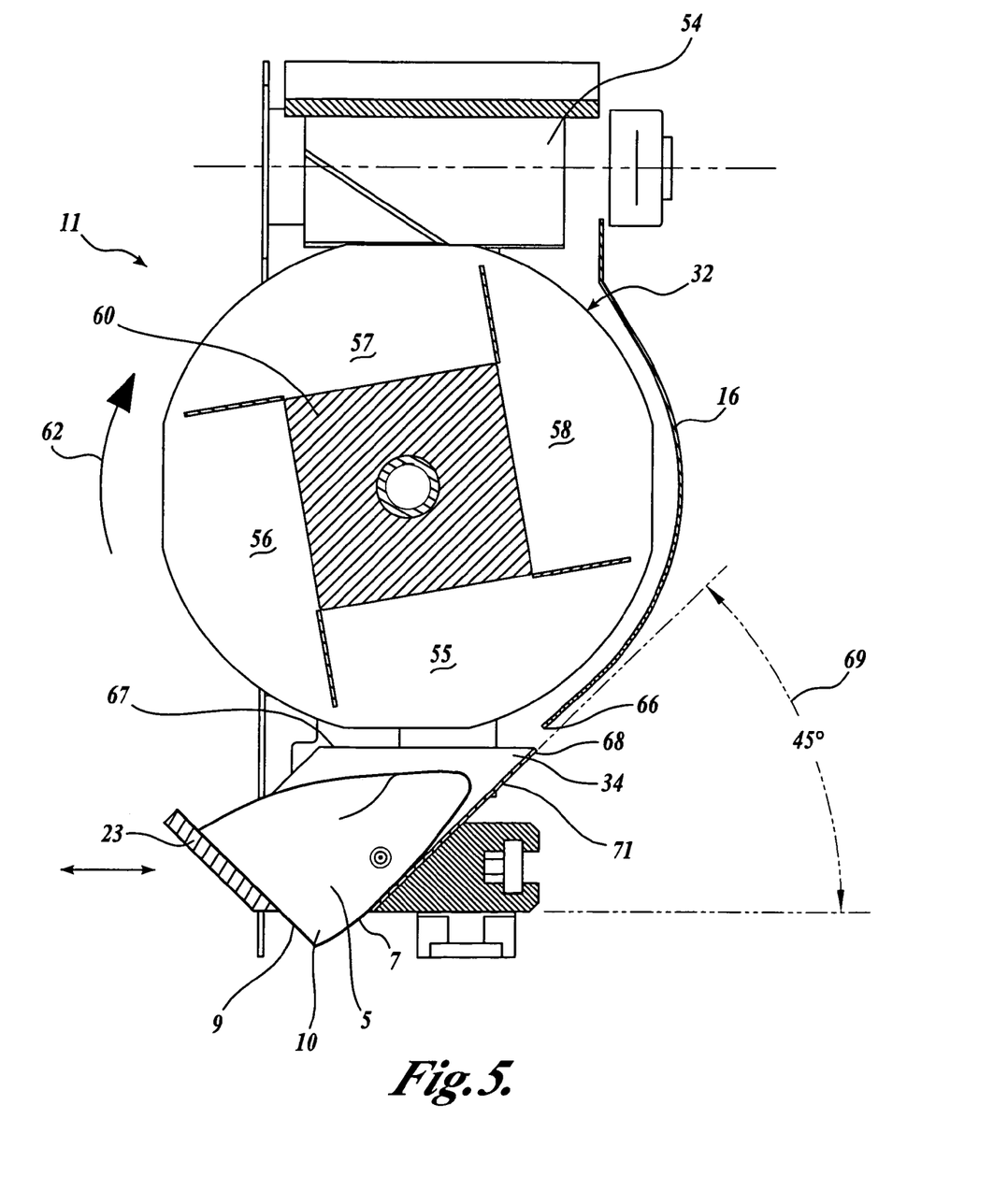
FIG. 5 shows a cross sectional view of the drum shown in FIG. 3 after rotation of the drum of about 25° in contrast to the position represented in FIG. 4.

At an angular position of approximately 135° shown in FIG. 5, the stationary catch (16) moves away from following the contour of the circular arc surrounding the drum (32). At its lower end (66), the stationary catch (16) runs out in a tangential trajectory (18) to this circular arc. The lower end (66) ends directly in front of an outlet (67) that defines the upper end of the synclinal chamber (34) facing toward the drum (32). The lower end (66) of the stationary catch (16) is preferably oriented such that it lies directly opposite a lateral boundary (68) of the chamber (34), so that the fish head (5) with its forehead face surface (7) sliding down the lower end (66) is guided into the chamber (34) at the lateral boundary (68).

The forehead face surface (7) lies on the tangential path of the lower end (66) at an angle of 135°. The cut surface (9) of the head (5) thus runs at an angle of about 45°, which is complimentary to the 45° angle of the forehead face surface (7) indicated in FIG. 5 by reference number 69. The pivoting device (11) in the form of the drum (32) has thereby turned the head (5) by nearly 180° as compared to its initial position shown in FIG. 3. As a result, the fish head (5) has been oriented in a chin-up position in which the chin face surface (6) is directed in an upward direction (i.e., facing upwards) and the meat in the neck section (10) is directed in a downward direction.

Referring back to the embodiment in FIGS. 1 and 2, beneath the pivoting device (11) is a conveyor belt (33) designed as an endless circular chain drive (19) with a generally horizontal carrying run (70). The chain drive (19) is provided with a plurality of synclinal chambers (34) attached thereto. The horizontal speed of the chain drive (19) and, with it, the speed of the synclinal chambers (34), together with the pivoting device (11) are synchronized via a chain drive (not represented) so that a synclinal chamber (34) is always located beneath the pivoting device (11) when a head (5) departs from it. The synclinal chambers (34) are configured slightly larger than the width of the heads (5). The carrying run (70) transports the chambers (34) through at a constant speed beneath the pivoting device (11). The heads (5) thereby fall into a position in the chambers (34) in which they have moved downward from the lower end (66) of the stationary catch (16). The fish heads (5) brace themselves with their cut surface (9) against a synclinal catch (23), which delimits the synclinal chamber (34) in the sliding direction of the head (5), as shown in FIGS. 3–7. The synclinal chamber (34) may be formed of a plastic body (21) that includes an underside (71) extending in the direction of the lower end (66), against which underside (71) the head with its forehead face surface (7) is braced. The head (5) is held in an upright position by delimiting surfaces (22, 24). The delimiting surfaces (22, 24) possess a mutual spacing, which is slightly greater than the width of the head (5).

Figure 6:
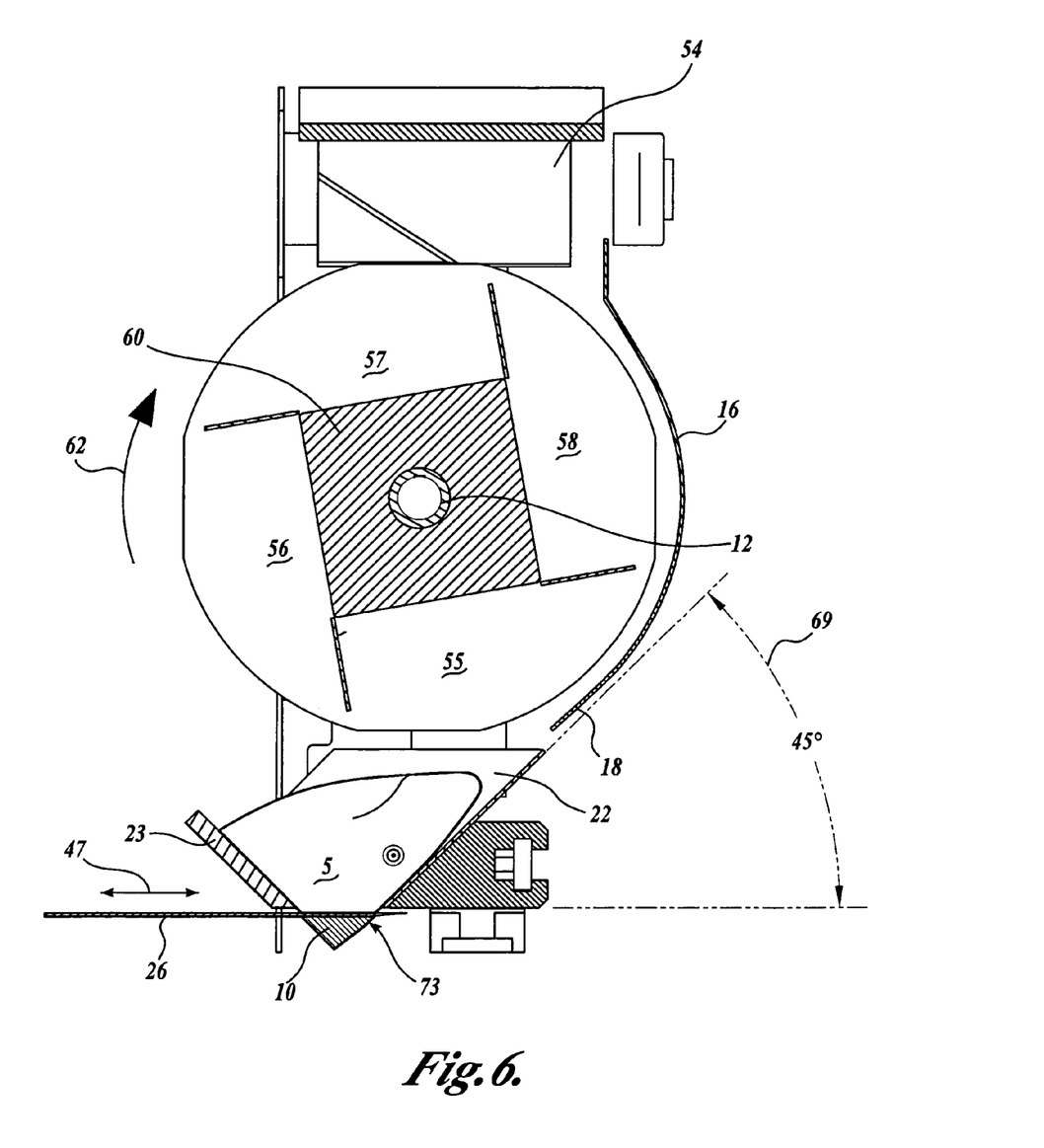
FIG. 6 shows a cross sectional view of the drum shown in FIG. 3 after further rotation of the drum, where a synclinal catch and synclinal chamber provide a wide passage for the neck meat to be cut from the fish head.
Figure 7:
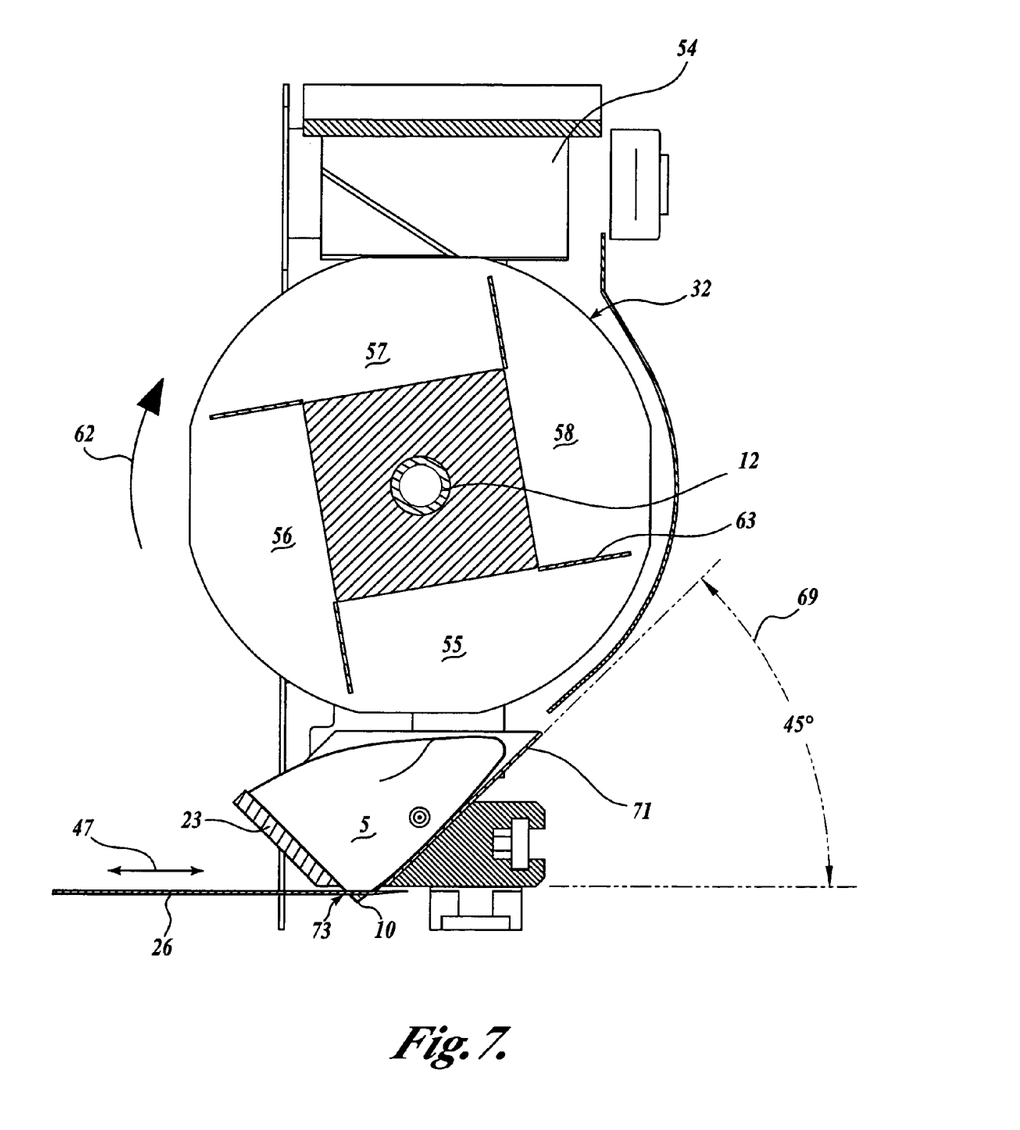
FIG. 7 shows a cross sectional view of the drum, catch and chamber shown in FIG. 6 with a narrow passage for the neck meat to be cut from the fish head.

At its lower end (72) located opposite the outlet (67) shown in FIG. 4, the synclinal chamber (34) is provided with a passage (73) through which protrudes the neck of a fish head lying in the chamber (34). The size of the passage (73) can be altered to match the size of the neck sections (10) of the fish being loaded onto the beheading machine (31). For example, in that regard the synclinal catch (23) can slide toward or away from the underside (71) of the synclinal chamber (34) in a horizontal direction illustrated by arrow (47). In the case of a narrow passage (73) as shown in FIG. 7, only a small section of the neck may protrude through the passage, while in the case of a large passage (73) as shown in FIG. 6, a large neck section may protrude out of the synclinal chamber (34).

Beneath the synclinal chamber (34) near the bottom of the fish head (5) is a cutting blade (26), which may be designed as a rotating cutter disc. Preferably, the cutter disc operates in a fixed position with only a slight spacing (e.g., a few millimeters) from the bottom of the synclinal chamber (34), so that the neck section (10) in the passage (73) comes upon the cutting blade (26) to separate the neck meat from the head. The cutting blade (26) is fixed in that it normally is not adjusted for each fish head received into the synclinal chambers (34). After the separation of the neck section (10), said section falls into a chute (25) in which it is led to a removal conveyor not represented here. At the same time, the remaining fish head (5) is transported further down in the carrying run (70) of the chain drive (19) and is discarded in the rerouting area (74), away from the conveyor belt (33).

Once the position of the synclinal catch (23) is set, the cut off triangular piece of the neck section (10) is the same size, whether the heads (5) are small or large. Individual settings for the size of the neck section of each fish head is not required because it is standard that presorted size selection of the fish has already been conducted prior to inserting the fish into the beheading machine (31). The same size triangular piece will be cut off due to the position of the synclinal catch (23).

Based on the simple mechanical conveyance of the cut off head (5) in the direction of the cutting blade (26), an apparatus can be constructed according to the invention with comparatively small dimensions so that it can be integrated beneath the beheading machine (31) without difficulty, and therefore require very little space. In particular, the apparatus does not occupy space that the operator of the beheading machine needs in order to properly pursue the tasks required of him at his work site, for example, to monitor a neighboring filet-cutting machine in its operations. An extra production room is also not required for the apparatus.

Furthermore, there are positive benefits from having the neck meat (10) protrude downward through the passage (73) in the direction of the cutting blade (26). Given the chin-up position of the fish head (5) during the separation of the neck meat (10), there are minimal consequences in terms of size differences of the fish heads for the manner in which the neck meat is cut. Based on the fact that the position of the neck meat (10) subject to be cut off remains constant, the cutting blade (26) can be operated at a fixed position relative to the passage (73). Position controls for the cutting blade (26) are not necessary or required.

While preferred embodiments of the invention have been illustrated and described in detail herein, it will be appreciated that various changes can be made therein without departing from the spirit and scope of the invention. The scope of the invention should therefore be determined from the following claims and equivalents thereto.

The embodiments of the invention in which an exclusive property or privilege is claimed are defined as follows:

1. An apparatus for recovering neck meat from a fish head that has been separated from the trunk of a fish, comprising:
   a pivoting device configured to receive and pivot the fish head into a chin-up position;
   a synclinal chamber configured to receive the fish head from the pivoting device and hold the fish head during separation of the neck meat from the fish head; and
   a cutting blade that operates near the bottom of the fish head being held in the synclinal chamber,
   wherein the synclinal chamber holds the fish head in the chin-up position so that the neck meat is downwardly directed toward the cutting blade for separation from the fish head.

2. The apparatus of claim 1, wherein the pivoting device is comprised of a drum having one or more chambers configured to receive the fish head, in which the drum is configured to rotate around a horizontally-arranged axis in a direction running with the longitudinal axis of the fish head.

3. The apparatus of claim 2, wherein the one or more chambers of the drum are defined by:
   a support surface that supports the fish head when the fish head is initially received in the drum, and
   lateral discs positioned with the support surface extending between them,
   wherein the width of the chambers between the lateral discs is sized to maintain the fish head in an upright position as the drum rotates the fish head into the chin-up position.

4. The apparatus of claim 3, wherein the one or more chambers of the drum are further defined by a bracing surface that extends from the support surface in the direction of the perimeter of the drum to separate the chambers and support the fish head along its neck as the drum rotates the fish head into the chin-up position.

5. The apparatus of claim 2, wherein the drum is configured to rotate in a direction such that the fish head is conveyed with its neck leading the direction of rotation.

6. The apparatus of claim 2, further comprising a stationary catch that surrounds a portion of the perimeter of the drum at a distance from the perimeter such that, upon rotation of the drum, a fish head in the one or more chambers can lean against the stationary catch without jamming between the stationary catch and the perimeter of the drum.

7. The apparatus of claim 6, wherein the top of the stationary catch begins near the top of the drum in the direction that the drum is rotating and extends around the drum toward the bottom where the stationary catch runs tangential to the perimeter of the drum in a direction toward the synclinal chamber into which the fish head slides predominantly on its forehead face surface.

8. The apparatus of claim 7, wherein the stationary catch begins at a rotational angle of about 10–20 degrees measured from a vertical axis and changes to run tangential to the perimeter of the drum at a rotational angle of about 120–140 degrees.

9. The apparatus of claim 1, wherein the synclinal chamber includes an underside extending between two delimiting plates, in which the underside supports the forehead face surface of the fish head that is received into the synclinal chamber.

10. The apparatus of claim 9, wherein the underside of the synclinal chamber is positioned in a direction running tangential to the perimeter of the pivoting device.

11. The apparatus of claim 9, wherein the width of the synclinal chamber between the two delimiting plates is sized to maintain the fish head in an upright position with its chin face surface oriented upwards.

12. The apparatus of claim 9, wherein the synclinal chamber is further configured with a synclinal catch against which a cut surface of the neck of the fish aligns when the fish head is received into the synclinal chamber.

13. The apparatus of claim 12, wherein the synclinal catch is positioned at an angle of approximately 90 degrees relative to the underside of the synclinal chamber.

14. The apparatus of claim 12, further comprising a passage defined between the synclinal catch and the underside of the synclinal chamber through which the neck meat of the fish head protrudes for separation from the fish head by the cutting blade.

15. The apparatus of claim 14, wherein the width of the passage is adjustable by positioning the synclinal catch and the underside of the synclinal chamber closer together or farther apart, thus permitting a lesser or greater amount of the neck meat to protrude through the passage for separation from the fish head.

16. The apparatus of claim 15, wherein the synclinal catch is movably arranged to slide toward or away from the underside of the synclinal chamber.

17. The apparatus of claim 14, wherein the cutting blade operates beneath the passage on an approximately horizontal plane in close proximity to the synclinal catch and the underside of the synclinal chamber so that the neck meat protruding through the passage is separated from the fish head by the cutting blade.

18. The apparatus of claim 1, wherein the cutting blade is a rotating circular blade operating in a fixed plane beneath the synclinal chamber.

19. The apparatus of claim 1, further comprising a plurality of synclinal chambers arranged in series and connected to a conveyor belt extending beneath the pivoting device.

20. The apparatus of claim 1, further comprising a device below the cutting blade that collects and transports away the neck meat that has been separated from the fish head.

21. The apparatus of claim 20, wherein the device below the cutting blade is a chute.

22. The apparatus of claim 1, wherein the synclinal chamber is further configured to transport and discard the remains of the fish head after the neck meat has been separated from the fish head.

23. An apparatus for recovering neck meat from a fish head that has been separated from the trunk of a fish, comprising:
    means for orienting the fish head into a chin-up position in which a chin face surface of the fish head is directed in an upward direction and the neck meat of the fish head is directed in a downward direction; and
    means for separating the neck meat from the fish head by subjecting the downwardly directed neck meat to a cutting blade that is operating in a fixed position near the bottom of the fish head.

24. The apparatus of claim 23, wherein the means for orienting the fish head includes a pivoting structure that uses gravity to orient the fish head in a chin-up position.

25. The apparatus of claim 23, wherein the cutting blade is configured to operate in a fixed horizontal cutting plane near the bottom of the fish head to separate the neck meat from the fish head.

26. The apparatus of claim 23, wherein the fish head has been separated from the trunk of the fish by a cut running approximately at a right angle to a longitudinal axis extending through the fish, the cut creating a cut surface on the fish head and the means for orienting the fish head using the cut surface to position the fish head for separation of the neck meat.

27. The apparatus of claim 26, further comprising a synclinal catch positioned at an acute angle to a horizontal cutting plane provided by the cutting blade, wherein the means for orienting the fish head is configured to align the cut surface of the fish head with the synclinal catch such that the neck meat protrudes through the horizontal cutting plane of the cutting blade.

28. The apparatus of claim 27, wherein the means for orienting the fish head is configured to pivot the fish head in an upright position to orient the fish head such that the cut surface of the fish head aligns with the synclinal catch.

* * * * *